Aug. 17, 1965 K. E. BUCKS ETAL 3,200,881
COOLING SYSTEMS
Filed Dec. 3, 1962
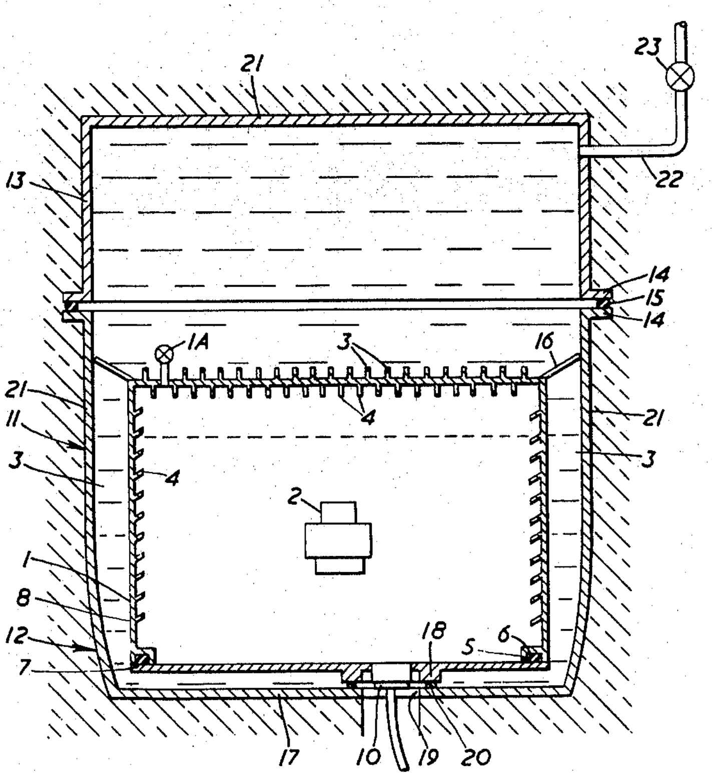

3,200,881

COOLING SYSTEMS

Karl Edward Bucks, Bognor Regis, and John Henry Calviou, Emsworth, England, assignor to The Plessey Company Limited, Ilford, England, a British company Filed Dec. 3, 1962, Ser. No. 243,185
Claims priority, application Great Britain, Dec. 6, 1961, 43,694/61
8 Claims. (Cl. 165—104)

This invention relates to a cooling system, and is more particularly concerned with arrangements for the cooling of electronic and/or electrical equipment.

It is well known that electrical or electronic equipment should not be operated at temperatures which exceed the maximum safe operational temperature which is prescribed for the safe working of the equipment.

The physical bulk of equipment which is intended to be used in modern supersonic aircraft and the like, must be reduced as much as possible so as to reduce its weight and the space required. In practice the circuit components are arranged as close as physically possible together in order to reduce the overall physical bulk of the equipment, and in addition the sizes of the components are reduced where ever possible. It will be understood that as soon as the physical separation between the components is reduced the heat which is generated during the operation of the equipment becomes much more difficult to dissipate and in consequence the equipment operates at excessively high temperatures. Furthermore the reduction in size often leads to lower wattage outputs available from the smaller sized components. This fact is particularly the case with radio transmitters and the like. It is thus sometimes necessary to "over-run" the equipment to obtain a higher output.

It will be apparent that it is thus essential that the heat produced during the operation of the equipment should be removed as rapidly and as effectively as possible in order to ensure that the components of the equipment do not exceed the maximum temperature at which they can safely operate. In many instances the maximum temperature at which the electrical or electronic components can safely operate is limited to a maximum of 125° C.

In a modern supersonic aircraft in flight the aircraft structure and the air available within the structure frequently reaches temperatures of the order of 130° C. This fact combined with the low air density which pertains at high altitudes means that it is not possible to use this air to remove waste heat from electrical or electronic equipment installed in the structure without utilising some form of refrigeration process to cool the air and also compression arrangements to increase the density of the air. It will be appreciated that as soon as it is necessary to introduce refrigeration means and additional compressors into the aircraft any advantages gained from the minaturisation of the electrical and electronic equipment is substantially completely nullified.

It is well known to extract heat from electrical and electronic equipment by the heating and evaporation of water or other substances possessing high latent heat of evaporation. Furthermore it is also well known to extract the heat from the equipment by means of heat transfer involving convention currents and/or the evaporation of inert liquids. The term "inert liquids" is intended to cover any liquid which will not chemically react with the materials which form part of the electronic or electrical equipment, which do not interfere with the electrical operation of the equipment and which have adequate dielectric properties both as to dielectric breakdown strength and low enough alternating voltage dielectric loss at high ratio frequencies.

It is an object of the present invention to provide means whereby electrical and/or electronic equipment can be maintained at a temperature at which the equipment can operate for substantially long periods.

Broadly, in accordance with the present invention apparatus or equipment to be cooled is located within a hermitically sealable container, which is to be partially filled to a predetermined depth with an inert liquid, the liquid having at its boiling point suitable dielectric properties, the first mentioned container being housed within a further container, the relative physical dimensions of the two containers being such as to provide a space around the first mentioned container which is intended to be filled with a second liquid which boils at or around 100° C. and which possesses a high latent heat of evaporation, and wherein a constant pressure valve which is settable to a preselected pressure is provided for controlling the pressure within said space.

A further aspect of the invention provides apparatus for cooling electrical and/or electronic equipment, comprising a hermetically sealable inner container within which the equipment is intended to be located, an outer container within which the inner container is to be housed, the relative dimensions of the two containers being such as to define a space between the containers for a second liquid, and wherein the outer container is provided with a constant pressure valve which is settable to a selected pressure and which is arranged to control the magnitude of the pressure within the space.

For a better understanding of the invention and to show how to carry the same into effect reference will now be made to the accompanying drawing which is a cross-sectional elevation of apparatus for cooling electrical and/or electronic equipment.

The apparatus includes an inner container 1 within which the electrical and/or electronic equipment to be cooled the latter being very schematically illustrated at 2. The equipment is positionally fixed relative to the container 1.

The container 1 is provided with fins 3 on its outer top surface and side surfaces, and with fins 4 on its inner top surface and side surfaces. If desired the internal finning can be omitted. The need for internal finning depends inter alia upon the total surface areas of the inner container. If this area is sufficient for the heat transfer required internal fins can be omitted.

The container 1 has a removable base 7 which is attachable to the remainder of the container by means (not shown), such means can be screws. With a view to obtaining a hermetic seal, the base 7 is provided with a sealing gland on O ring 5 located in a recess 6 in the end faces of the walls 8 of the remainder of the container.

A plug and/or socket unit 10 is provided in the base 7, whereby electrical connections may be made with the equipment 2. A liquid filling nozzle with a suitable valve 1A is provided.

The container 1 is housed within an outer container 11 which is of such dimensions relative to the container 1 as to leave a space between the two containers. The distance between the internal face of the side of the unit 12 and the fins 4 on the sides 8 of the container 1 is kept as small as possible. The container 11 comprises two main sections—a bottom unit 12 which is capable of wholly containing the container 1, and a lid or top unit 13. Both the unit 12 and 13 are provided with outwardly directed flanges 14 which are intended to sandwich a sealing gland 15 such as an endless seal commonly termed O ring to obtain a hermetic or gas tight seal at the joint between the two units 12 and 13.

The container 1 is supported by brackets, links or other convenient means 16 so that there is a small gap between the base 7 and the bottom 17 of the container 11. The base plate 7 has a tubular part 18 integral therewith which is extendable to align with a bore 1*a* in the bottom 17 of the container 11. A sealing gland 20 provides a fluid-tight seal between the part 18 and the bottom 17.

The container unit 12 is provided with finning 21 on its side and top surfaces; and the unit 13 is provided with fins 21 on its sides and top surfaces.

A fluid inlet duct or conduit 22 connects with the interior of the unit 13. A constant pressure exhaust valve 23 is provided in the conduit. The conduit and valve are used for filling the container 11.

The outer container 11 is externally thermally insulated by suitable lagging 24 such as fibre glass so as to reduce the quantity of heat flowing into the interior of the outer container 11 to less than a small proportion of that dissipated by the equipment 2 to be cooled.

The above described apparatus is used as follows.

The inner container is partially filled with an inert liquid of suitable dielectric properties at its boiling point. The quantity of liquid used is such as to at least cover the equipment 2 within the container when the liquid has reached its operating temperature. Preferably the inner container is degassed via the nozzle 1A so that on introducing the inert liquid through the nozzle 1A the unfilled space within the container is air free and will thus be occupied by inert liquid vapour.

Such inert liquids can be isomers or fluorochemical ethers or amines. Specific examples of such fluorochemical inert liquids are known under the trade nomenclature FC.43 and FC–75.

The liquid FC–75 is a colourless liquid with a boiling point between 210° F., with an average value of 214° F. Its composition is principally isomers of perfluoro cyclic ether $C_8F_{16}O$.

After filling with the inert liquid the container 1 is inserted into the outer container unit 12, care being taken to ensure the liquid tight seal by gland 20, and the brackets 16 are used to secure the inner container relative to the outer container.

The container unit 13 is attached to the lower container unit 12 and the outer container is filled with water containing an additive which is able to depress the freezing point of the water. A suitable additive is glycol.

Alternatively the space is filled with some other liquid which boils at approximately 100° C. and which possesses a high latent heat of evaporation.

The absolute pressure valve is set to operate at a pressure which is slightly above atmospheric pressure at ground level. A convenient pressure setting can be 17 or 18 lbs. per square inch.

It will be noted that the largest proportion of the liquid within the outer container 11 is located above the actual inner container 1. This arrangement has been found to provide improved heat transfer.

The above described apparatus works in the following manner. The heat generated by the equipment 2 to be cooled, i.e., the equipment 2 located within the hermetically sealed container 1 is given up to the inert liquid within the inner container. This heat is transferred to the container 1 by a combination of an autoconvective liquid heat transfer mode and by an evaporation condensation heat transfer mode. It is believed that the inert liquid within the sealed container is subjected to a substantially rapid stirring action by reason of the convection currents.

The heat is removed from the sealed inner container 1 by evaporation of the water contained within the outer container 11. The steam thus produced escapes through the constant absolute pressure valve 23 which thereby ensures a sensibly constant boiling temperature irrespective of external air pressure. The pressure valve setting of 18 lbs. per square inch absolute would maintain a water jacket temperature of 105.5° C., this in turn with a practical heat exchanger temperature drop of 2.5° provides an internal temperature of 108° C. within the sealed container.

What we claim is:

1. Apparatus for cooling electrical equipment comprising a sealed container within which a piece of electrical equipment may be situated, a liquid partly filling the said sealed container and which may contact the said equipment, both the liquid and its vapour being inert and having dielectric properties, an outer container surrounding the sealed container, a valve connecting the interior of the outer container to the atmosphere and controlling the magnitude of the pressure within the outer container, a second liquid at least partly filling the space between, and in contact with, the inner surface of the outer container and the outer surface of the sealed container, the boiling point of the second liquid at the pressure defined by the said valve being not greater than the maximum permissible service temperature of the said electrical equipment and heat being removed from the apparatus by vapourisation of the said second liquid, and wherein the sealed container has a wall projecting from its outer surface and sealed to the inner surface of the outer container, means forming an aperture in the outer container to provide access to said wall, said wall being adapted to support an electrical connection means.

2. Apparatus according to claim 1, wherein the boiling point of the liquid within the sealed container is substantially higher from that of the said second liquid.

3. Apparatus according to claim 1, wherein the greater volume of the space defined by the inner surface of the outer container and the outer surface of the sealed container is located above the upper surface of the sealed container.

4. Apparatus according to claim 1, wherein the said second liquid consists essentially of water.

5. Apparatus according to claim 1, wherein at least part of the inner surface of the sealed container is provided with inwardly-directed fins.

6. Apparatus according to claim 1, wherein at least part of the outer surface of the sealed container is provided with outwardly-directed fins.

7. Apparatus according to claim 1, comprising also thermal insulation means surrounding at least part of the outer surface of the outer container.

8. Apparatus for cooling electrical equipment comprising a sealed container within which a piece of electrical equipment may be situated, a liquid partly filling the said sealed container and which may contact the equipment, both the liquid and its vapour being inert and having dielectric properties and providing heat transfer from the equipment to the sealed container by both convective and vapour cycle means, an outer container surrounding the sealed container and defining a space substantially bigger than the sealed container, which is situated in the lower part of the said space, a pressure relief valve connecting the interior of the outer container to the atmosphere and controlling the magnitude of the pressure within the outer container, and a second liquid consisting at least essentially of water contained in the space defined by the inner surface of the outer container and the outer surface of the sealed container, the pressure defined by the said valve being such that the boiling point of the said second liquid at the defined pressure does not exceed the maximum permissible service temperature of the electrical equipment and heat being removed from the apparatus by vapourisation of the said second liquid, and the sealed container having a wall projecting from its outer surface and sealed to the inner surface of the outer container, means forming an aperture in the outer container to provide access to said wall, said wall being adapted to support an electrical connection means.

References Cited by the Examiner

UNITED STATES PATENTS

| | | | |
|---|---|---|---|
| 1,891,959 | 12/32 | Sprong | 174—17 |
| 1,960,415 | 5/34 | Miller | 236—58 |
| 2,958,021 | 10/60 | Cornelison | 165—48 |
| 2,985,707 | 5/61 | Ahearn et al. | 165—105 |
| 3,006,611 | 10/61 | Isham | 165—47 |

FOREIGN PATENTS

| | | |
|---|---|---|
| 541,178 | 5/57 | Canada. |

ROBERT A. O'LEARY, *Primary Examiner.*

FREDERICK L. MATTESON, Jr., CHARLES SUKALO, *Examiners.*